April 15, 1924.  C. G. FAUNCE  1,490,812
WHEEL FOR ROAD GRADERS AND THE LIKE
Filed Dec. 28, 1922  2 Sheets-Sheet 1
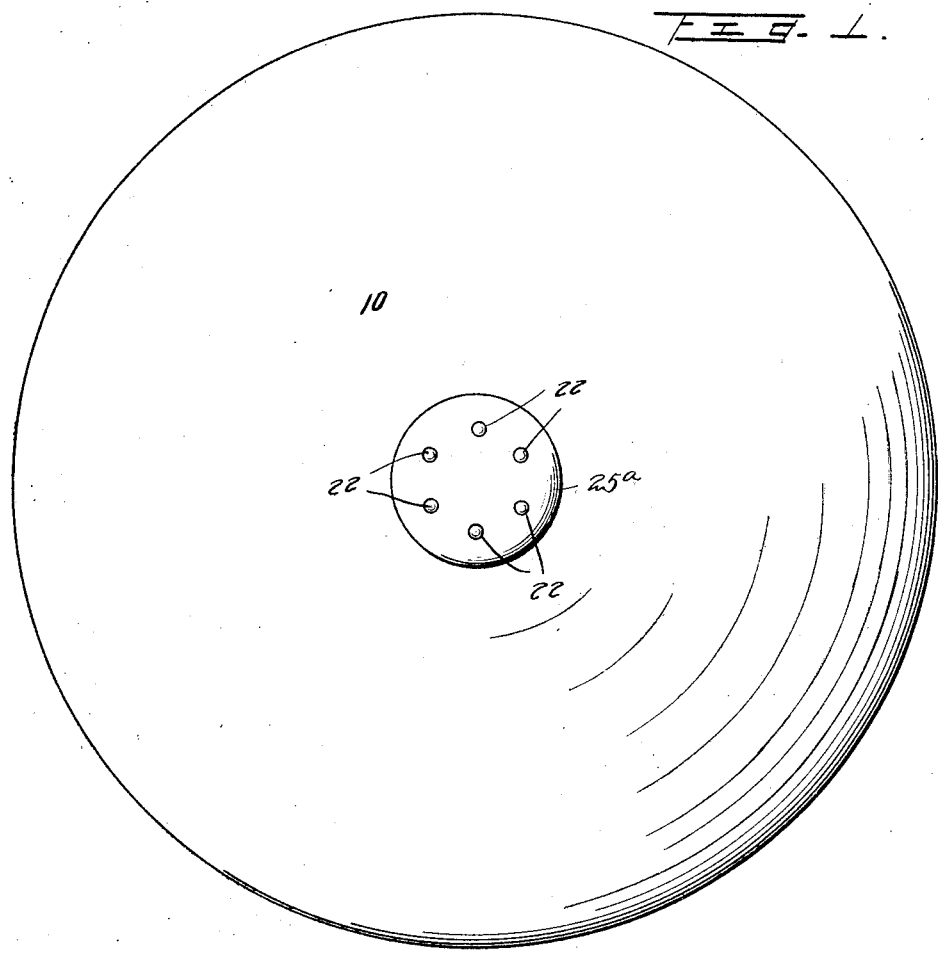
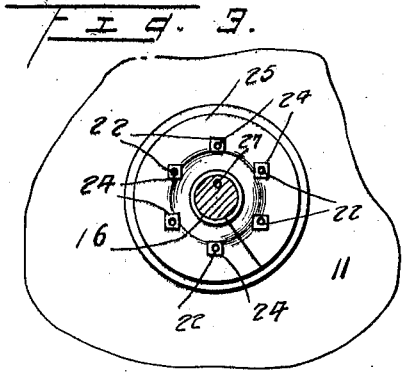
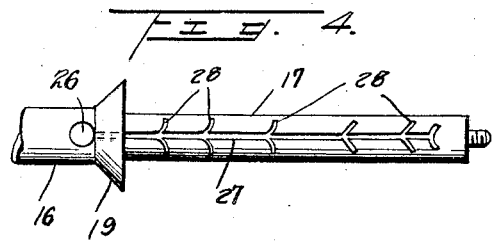
Inventor
C. G. Faunce
By [signature]
Attorney April 15, 1924.  
C. G. FAUNCE  
1,490,812  
WHEEL FOR ROAD GRADERS AND THE LIKE  
Filed Dec. 28, 1922     2 Sheets-Sheet 2
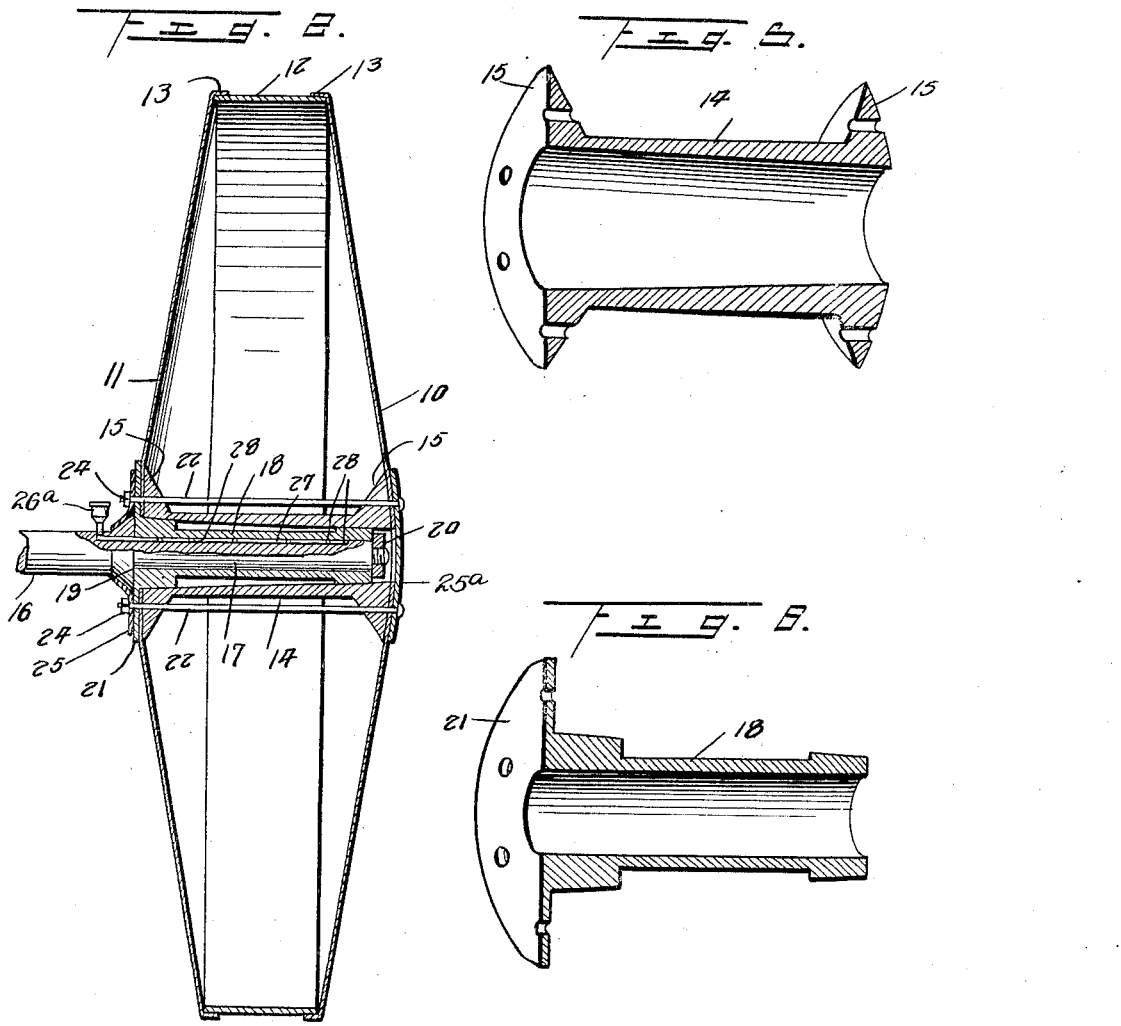
Inventor  
C. G. Faunce,  
By   
Attorney Patented Apr. 15, 1924.

1,490,812

UNITED STATES PATENT OFFICE.

CLARENCE G. FAUNCE, OF ELDORADO, KANSAS.

WHEEL FOR ROAD GRADERS AND THE LIKE.

Application filed December 28, 1922. Serial No. 609,425.

*To all whom it may concern:*

Be it known that I, CLARENCE G. FAUNCE, a citizen of the United States, residing at Eldorado, in the county of Butler and State of Kansas, have invented certain new and useful Improvements in Wheels for Road Graders and the like; and I do hereby declare the following to be a full, clear, and exact description of the invention, such as will enable others skilled in the art to which it appertains to make and use the same.

The object of the invention is to provide a wheel for use in connection with road graders and like machines and vehicles particularly employed for example in agricultural work, for preventing the access of soil, sand and dirt generally to the wheel bearing or journal and preventing the accumulation of the soil on the surfaces of the wheel and at the same time minimizing the tendency of the wheel to stick or block in soft surfaces or loose soil and becoming stalled while requiring an unnecessary amount of power in order to effect the progress thereof; and with these objects in view the invention consists in a construction, combination and relation of parts of which a preferred embodiment is shown in the drawing, wherein:

Figure 1 is a side view and

Figure 2 is a sectional view in the plane of its axis of a wheel constructed in accordance with the invention, Figure 3 is an inner side view of the central portion of the wheel, Figure 4 is a detail view of the axle spindle to show the lubricating grooves or studs therein, Figures 5 and 6 are perspective sectional views of the wheel hub and the boxing or sleeve.

The wheel consists essentially of reversely bowed disks which for convenience may be termed the outer and inner disks 10 and 11 of metal connected at their peripheries by a band 12 forming the wheel rim and over the edges of which the peripheries of the disks are folded and to which the flanges 13 thus provided are welded or brazed to form an integral construction; associated with which is the hub 14 provided with terminal heads or enlargements 15 which are in contact with the inner surfaces of the disks 10 and 11 at their centers and serves as the spreader or strut whereby the disks are held in their bowed condition. In the assembly of the parts of the wheel the rim is first attached for example to the disk 10 and the hub is then positioned in contact with the center of the disk 10 after which the disk 11 is positioned and secured at its periphery to the rim and at its center to the adjacent head or enlargement of the hub so that the hub is enclosed permanently within the housing afforded by the outer and inner bowed disks and the connecting rim.

The axle 16 is provided with the usual spindle 17 upon which is fitted the boxing or sleeve 18, said axle having a collar 19 for limiting the inward movement of the wheel hub and the spindle and boxing being of a length less than the bore of the hub so as to terminate short of the outer end thereof as indicated in Figure 2 and the spindle is secured in the boxing by means of a conventional form of spindle nut 20 serving to maintain the proper operative relations of the spindle and boxing or sleeve.

The boxing is provided at its inner end with a flange 21 which bears against the axle collar 19 and preferably is substantially coextensive with the adjacent hub head or enlargement but is in contact with the exterior surface of the inner disk 11. After the boxing or sleeve has been placed and secured upon the axle spindle the previously assembled body portion of the wheel consisting of the outer and inner disks 10 and 11 with the rim 12 and hub 14, is fitted upon the boxing or sleeve and thereupon connection of the body of the wheel with the flange 21, and hence with the boxing or sleeve, is effected by means of tie bolts 22 extending in parallelism with the axis of the wheel from the exterior surface of the outer disk entirely through the wheel and flange 21 where they are engaged by suitable nuts 24 which are also utilized to secure in place a flexible or yielding mud guard 25 arranged in contacting relation with the beveled inner surface of the axle collar 19.

Furthermore it is preferred to arrange a bearing cap or disk 25ª in contact with the exterior surface of the outer disk 10 and held in place by the tie bolts, as a means of reinforcement.

The final assembly and mounting of the wheel therefore is accomplished by the adjustment of the bolts 22 which serve to secure the body portion of the wheel to the flange of the axle box or sleeve which in turn has been secured to the axle spindle under conditions preventing longitudinal displacement thereof while permitting rotation thereon.

Arranged in the axle collar is a feed opening 26 for lubricant, either oil or grease adapted to be introduced in any preferred manner as for instance by a lubricator 26ª and communicating with such feed opening is an oil duct or channel 27 extending longitudinally of the axle spindle and having suitable laterals 28 for conveying the lubricant effectively to the surfaces of the spindle and bearing sleeve or boxing.

It will be observed that the outer end of the hub bore is closed and the access of dirt at that point is impossible. It will also be obvious that the spindle may be lubricated without removal of the wheel and that the tapered construction of the body portion of the wheel from its center toward its periphery will prevent it from gathering dirt or soil in passing over a soft or loose surface and at the same time will prevent the clogging or stalling of the same.

The body of the wheel may be removed from the axle by the loosening of the tie bolts which gives access to the spindle and bearing box.

Having thus described the invention, what I claim is:—

1. A wheel having reversely bowed side disks peripherally connected by a rim and a hub interposed between the centers of said disks to hold them in their bowed condition, in combination with a boxing or sleeve for rotative engagement with an axle spindle and means for removably attaching the hub to the boxing or sleeve.

2. A sleeve having reversely bowed side disks peripherally connected by a rim and a hub interposed between the centers of said disks to hold them in their bowed condition, in combination with the boxing or sleeve for rotative engagement with an axle spindle and means for removably attaching the hub to the boxing or sleeve, the outer end of the hub being permanently closed and the axle spindle and boxing being completely housed therein.

3. A wheel having reversely bowed side disks peripherally connected by a rim and a hub interposed between the centers of said disks to hold them in their bowed condition, in combination with a boxing or sleeve and means for rotatively mounting it on an axle spindle, the boxing having a flange at its inner end and means for removably securing the hub thereto.

4. A wheel having reversely bowed side disks peripherally connected by a rim and a hub interposed between the centers of said disks to hold them in their bowed condition, in combination with a boxing or sleeve and means for rotatively mounting it on an axle spindle, the boxing having a flange at its inner end, and tie bolts extending through the hub from disk to disk and detachably engaging said flange.

5. A wheel having reversely bowed side disks peripherally connected by a rim and a hub interposed between the centers of said disks to hold them in their bowed condition, in combination with a boxing or sleeve and means for rotatively mounting it on an axle spindle, the boxing having a flange at its inner end, and tie bolts extending through the hub from disk to disk and detachably engaging said flange, said hub being provided with terminal heads or alignments, through which the tie bolts extend.

6. A wheel having reversely bowed side disks peripherally connected by a rim and a hub interposed between the centers of said disks to hold them in their bowed condition, in combination with a boxing or sleeve and means for rotatively mounting it on an axle spindle, the boxing having a flange at its inner end, and tie bolts extending through the hub from disk to disk and detachably engaging said flange, said hub being provided with terminal heads or alignments through which the tie bolts extend, and a flexible mud guard secured to the inner end of the hub by means of said tie bolts.

In testimony whereof I affix my signature in presence of two witnesses.

CLARENCE G. FAUNCE.

Witnesses:
R. R. FELLER,
LILLIE N. JOHNSON.